(12) United States Patent
Berthaud et al.

(10) Patent No.: US 8,949,432 B2
(45) Date of Patent: *Feb. 3, 2015

(54) IDENTITY MANAGEMENT

(71) Applicant: International Business Machines Corporation, Armonk, NY (US)

(72) Inventors: Jean-Marc Berthaud, La Gaude (FR); Stephane Lebrun, La Gaude (FR); Charles Manghini, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/903,271

(22) Filed: May 28, 2013

(65) Prior Publication Data
US 2013/0268670 A1 Oct. 10, 2013

Related U.S. Application Data

(63) Continuation of application No. 13/016,116, filed on Jan. 28, 2011, now Pat. No. 8,495,219.

(51) Int. Cl.
*G06F 15/173* (2006.01)
*H04L 29/06* (2006.01)
*G06F 9/455* (2006.01)

(52) U.S. Cl.
CPC .............. *H04L 63/10* (2013.01); *G06F 15/173* (2013.01); *G06F 9/455* (2013.01)
USPC .......................................... 709/226; 709/225

(58) Field of Classification Search
CPC ........ G06F 15/173; G06F 9/455; H04L 63/10
USPC .................................................. 709/225, 226
See application file for complete search history.

(56) References Cited

U.S. PATENT DOCUMENTS

| 6,725,269 | B1 | 4/2004 | Megiddo |
| 7,689,627 | B2 | 3/2010 | McAfee |
| 8,495,219 | B2 * | 7/2013 | Berthaud et al. ............... 709/226 |
| 2003/0140230 | A1 | 7/2003 | de Jong et al. |
| 2005/0198303 | A1 | 9/2005 | Knauerhase et al. |
| 2008/0256594 | A1 | 10/2008 | Satish et al. |

(Continued)

FOREIGN PATENT DOCUMENTS

WO 2009136795 11/2009

OTHER PUBLICATIONS

Office Action (Mail Date Jan. 3, 2013) for U.S. Appl. No. 13/016,116, filed Jan. 28, 2011.

(Continued)

*Primary Examiner* — Jung Park
*Assistant Examiner* — Albert Shih
(74) *Attorney, Agent, or Firm* — Schmeiser, Olsen & Watts; John Pivnichny

(57) ABSTRACT

An identity management method and system is disclosed. The method includes identity context management (ICM) clients monitoring access to Internet resources using dedicated Virtual Machines (VM). An ICM server monitors associations between Internet resource identifiers (IDs) and the Internet resources accessed by the VMs. The VMs register context for the ICM clients with the ICM server. An ICM client enables access to Internet resources and presentation of Webpages and Internet contents associated with the Internet resources within the associated Virtual Machine context.

20 Claims, 10 Drawing Sheets

(56) References Cited

U.S. PATENT DOCUMENTS

2009/0300152 A1   12/2009  Ferris
2009/0300742 A1   12/2009  Ahn
2012/0185849 A1    7/2012  Berthaud et al.

OTHER PUBLICATIONS

Amendment filed Mar. 19, 2013 in response to Office Action (Mail Date Jan. 3, 2013) for U.S. Appl. No. 13/016,116, filed Jan. 28, 2011.
Notice of Allowance (Mail Date Apr. 2, 2013) for U.S. Appl. No. 13/016,116, filed Jan. 28, 2011.

* cited by examiner

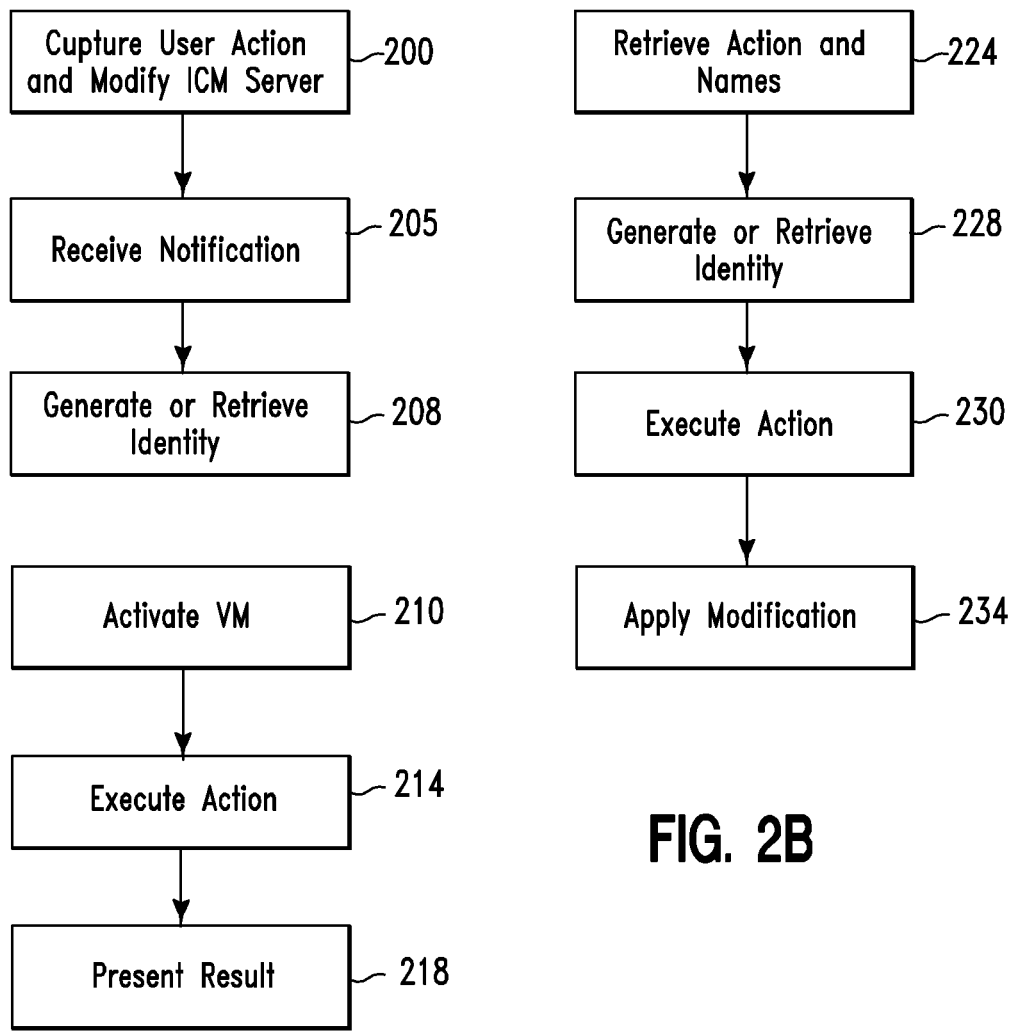

IDENTITY MANAGEMENT

This application is a continuation application claiming priority to Ser. No. 13/016,116 filed Jan. 28, 2011, now U.S. Pat. No. 8,495,219, issued Jul. 23, 2013.

FIELD

The present invention relates to a method and associated system for managing multiple identities.

BACKGROUND

Protecting information typically comprises an inefficient process with little flexibility. Accordingly, there exists a need in the art to overcome the deficiencies and limitations described herein above.

SUMMARY

The present invention provides a An identity management method comprising: registering, by a computer processor of a computing system, identity context management (ICM) clients of said computing system with an ICM server of said computing system; monitoring for a user, by an ICM client of said ICM clients, access to a first Internet resource; transmitting, by said ICM client to said ICM server, a notification indicating said access to said first Internet resource; transmitting, by said ICM server to said user, a first request for an ID associated with said first Internet resource; receiving, by said ICM server from said user in response to said first request, a first ID associated with said first Internet resource; recording, by said ICM server, an association describing said first ID associated with said first Internet resource; generating, by said ICM server in response to said receiving said first ID, a first virtual machine (VM) within said computing system; enabling, by said ICM server, said first VM; registering, by said first VM, said ICM client with said ICM server; enabling, by said ICM client in response to a command from said ICM server, access to said first Internet resource; and presenting, by said first VM to said user in response to said enabling said first Internet resource, first Webpages and first Internet contents associated with said first Internet resource.

The present invention provides a computer program product, comprising a computer readable storage medium having a computer readable program code embodied therein, said computer readable program code comprising an algorithm that when executed by a computer processor of a computing system implements a method comprising: registering, by said computer processor, identity context management (ICM) clients of said computing system with an ICM server of said computing system; monitoring for a user, by an ICM client of said ICM clients, access to a first Internet resource; transmitting, by said ICM client to said ICM server, a notification indicating said access to said first Internet resource; transmitting, by said ICM server to said user, a first request for an ID associated with said first Internet resource; receiving, by said ICM server from said user in response to said first request, a first ID associated with said first Internet resource; recording, by said ICM server, an association describing said first ID associated with said first Internet resource; generating, by said ICM server in response to said receiving said first ID, a first virtual machine (VM) within said computing system; enabling, by said ICM server, said first VM; registering, by said first VM, said ICM client with said ICM server; enabling, by said ICM client in response to a command from said ICM server, access to said first Internet resource; and presenting, by said first VM to said user in response to said enabling said first Internet resource, first Webpages and first Internet contents associated with said first Internet resource.

The present invention provides a computing system comprising a computer processor coupled to a computer-readable memory unit, said memory unit comprising instructions that when executed by the computer processor implements a method comprising: registering, by said computer processor, identity context management (ICM) clients of said computing system with an ICM server of said computing system; monitoring for a user, by an ICM client of said ICM clients, access to a first Internet resource; transmitting, by said ICM client to said ICM server, a notification indicating said access to said first Internet resource; transmitting, by said ICM server to said user, a first request for an ID associated with said first Internet resource; receiving, by said ICM server from said user in response to said first request, a first ID associated with said first Internet resource; recording, by said ICM server, an association describing said first ID associated with said first Internet resource; generating, by said ICM server in response to said receiving said first ID, a first virtual machine (VM) within said computing system; enabling, by said ICM server, said first VM; registering, by said first VM, said ICM client with said ICM server; enabling, by said ICM client in response to a command from said ICM server, access to said first Internet resource; and presenting, by said first VM to said user in response to said enabling said first Internet resource, first Webpages and first Internet contents associated with said first Internet resource.

The present invention advantageously provides a simple method and associated system capable of protecting information.

BRIEF DESCRIPTION OF THE DRAWINGS

FIG. 2A illustrates an algorithm used by the system of FIG. 1 for implementing a process for allowing a user to retrieve information, in accordance with embodiments of the present invention.

FIG. 2B illustrates an algorithm used by the system of FIG. 1 for implementing a process for allowing a user to manage identity contexts, in accordance with embodiments of the present invention.

DETAILED DESCRIPTION

Figure 1:
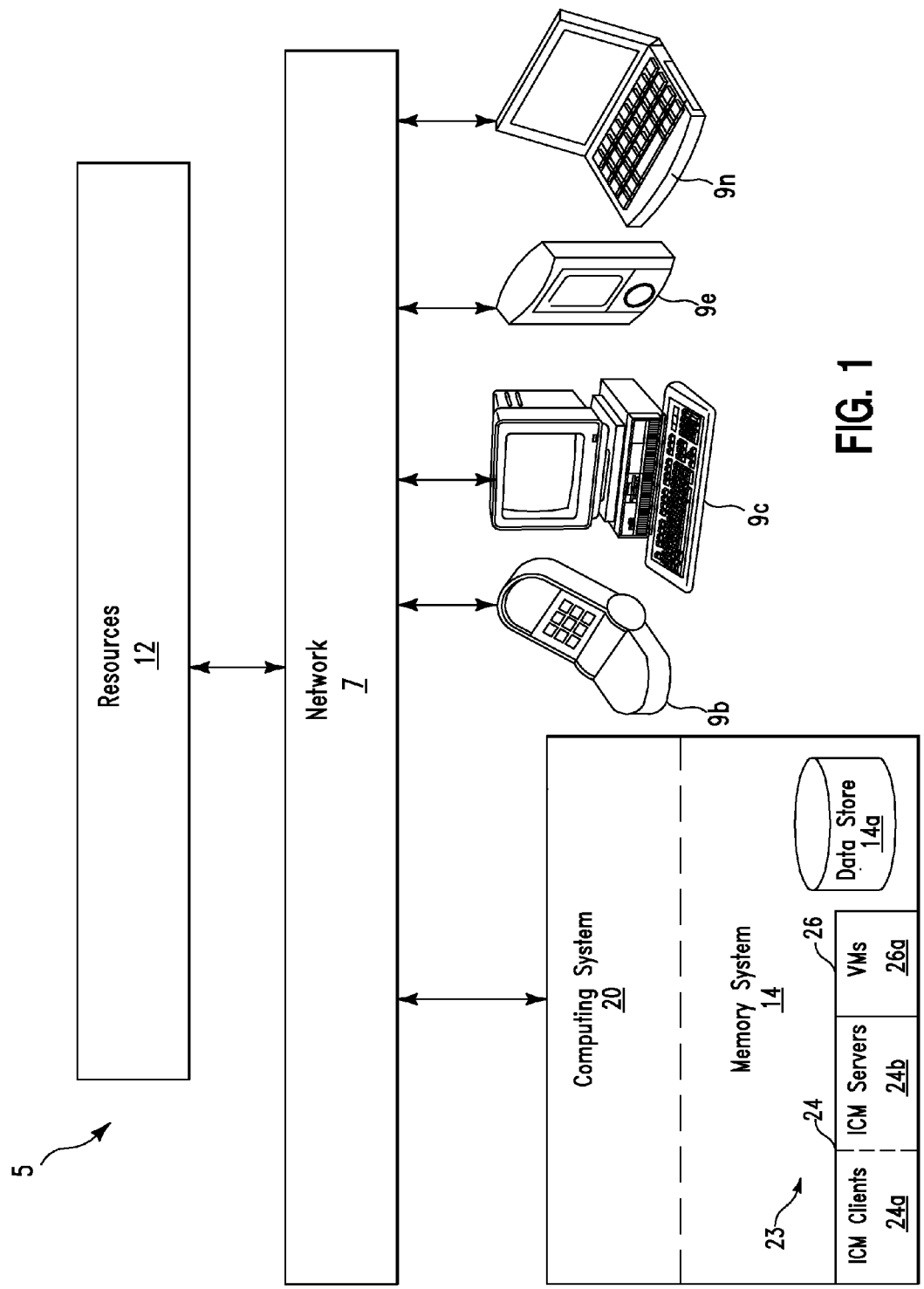
FIG. 1 illustrates a system for managing multiple identities, in accordance with embodiments of the present invention.

FIG. 1 illustrates a system 5 for managing multiple identities, in accordance with embodiments of the present invention. System 5 allows for the use of virtual machines (VMs)

for executing Internet access means such as, inter alia, browsers or email clients for isolation/partitioning of user identities associated with users accessing information on the Internet. Additionally, system 5 enables a differential feature of VMs for managing a hierarchy of user identities.

System 5 of FIG. 1 comprises Internet resources 12 (e.g., mail servers, content Web servers, news servers, etc) connected to devices 9a . . . 9n through a network 7 such as the Internet. Device 9a illustrates an internal block diagram view of devices 9b . . . 9n. Network 7 may comprise any type of network including, inter alia, a telephone network, a local area network, (LAN), a wide area network (WAN), the Internet, a wireless network, etc. Devices 9a . . . 9n may comprise any type of computing device capable of connecting to the Internet such as, inter alia, a computer (PC), a server computer, a database computer, etc. Devices 9a . . . 9n each comprise a memory system 14. Memory system 14 may comprise a single memory system. Alternatively, memory system 14 may comprise a plurality of memory systems. Memory system 14 comprises a software system 23 and a (context and identities) data store 14a (e.g., a database). Software system 23 comprises an identity context management component 24 and an identity context execution engine 26 comprising virtual machines 26a (VMs).

Identity context management component 24 comprises:
1. Identity context management (ICM) clients 24a for monitoring clicks or actions in Web browsers, email systems, etc. ICM clients 24a may run on main system (e.g., computing system 20) or on VMs 26a.
2. ICM servers 24b that receive client notifications and execute decisions associated with identities and locations for executing requests. ICM clients 24a and ICM servers 24b isolate VMs 26a such that ICM clients 24a notify ICM servers 24b regarding captured actions and receive/execute commands from ICM servers 24b in order to enable Internet browsing/Internet resource access.

Identity context execution engine 26 executing each identity context as a VM of VMs 26a. Each of VMs 26a comprises:
1. A virtual central processing unit (CPU) for executing functions.
2. Allocated virtual memory isolated from all other of VMs 26a.
3. Allocated file system (space) on a disk isolated from all other of VMs 26a. The allocated file system space represents a VM state and includes operating execution and data files, navigation means execution and data files, additional files, etc. (data file may include, inter alia, configuration data, Internet navigation means context, etc). The allocated file system includes an applied differential feature including a capability to store a VM state (i.e., file system) as a delta (i.e., a differential feature) of another VM state. The file system of a VM includes a sum of all components of a chain of deltas from a first root VM (i.e., comprising an order from a root VM to a current VM). An executing VM is represented by its own delta file compared to its last stored VM state. Any stored VM state may comprise a full file system image or a delta compared to another VM state.

User identities may comprise a hierarchal relationship. A hierarchal relationship between two user identities is defined by a unidirectional relation between two identities whereby at creation time, a second identity context is copied from a first identity (i.e., with a different name and a 0-size VM delta file compared to a last stored state of the first identity VM. The two idenities are independent from each other by a VM delta to a reference which may become fixed. Each of the two identities may comprise a parent of any number of hierarchal relationships. Each identity may only comprise a lower ordered entity of one hierarchal relationship and may be represented by a delta file representing a lower ordered entity VM file system as compared to a file system of a non executing portion of an associated parent VM. A delta (or differential) file therefore comprises: added data blocks, modified data blocks, and suppressed data blocks compared to a stored state (of a non executing portion) of a parent file system. When an executing VM is deactivated, a capability to replace a last stored VM state is augmented with a delta as a new state. When an augmented state for a VM is stored (i.e., if a parent VM against which a lower ordered VM has been created), the augmented state is stored as delta compared to a last stored state and is additionally used as reference for a lower ordered VM state. If there is no sibling, a last stored state file is replaced by an augmented concatenation result.

Data store 14a is used to:
1. Store identity names and URL/Internet context associated with an identity storing a VM state
2. Store relationships (hierarchal) between identities and match relationships between VM states.

FIG. 2A illustrates an algorithm used by system 5 of FIG. 1 for implementing a process for allowing a user to retrieve information, in accordance with embodiments of the present invention. In step 200, a computer processor (i.e., of a computing system such as, inter alia, computing system 20 of FIG. 1) executing an ICM client (e.g., one of ICM clients 24a of FIG. 1 within a VM) captures a user action (e.g., enabling an Internet resource, activating email, etc) and notifies an ICM server (e.g., one of ICM servers 24b of FIG. 1) of the user action. In step 204, the ICM server receives (i.e., from the ICM client) the notification (of step 200). In step 205, the ICM server generates or retrieves an identity and an associated VM (execution content). The identity and an associated VM is associated and stored with the user action of step 200. In step 210, the ICM server activates the VM. In step 214, the ICM server transmits a command (i.e., within the VM) to execute the user action and present a related result (i.e., from the executed user action) to the user.

FIG. 2B illustrates an algorithm used by system 5 of FIG. 1 for implementing a process for allowing a user to manage identity contexts, in accordance with embodiments of the present invention. In step 224, a computer processor (i.e., of a computing system such as, inter alia, computing system 20 of FIG. 1) executing an ICM server retrieves an administrative action and names associated with identity contexts for managing. In step 228, the ICM server generates or retrieves an associated identity (i.e., associated with the administrative action) and associated VM from a data store (e.g., data store 14a of FIG. 1). In step 230, the ICM server executes the administrative action on the associated identity (and associated context). In step 234, the ICM server applies a modification (based on results of step 230) to the data store.

Figure 3A:
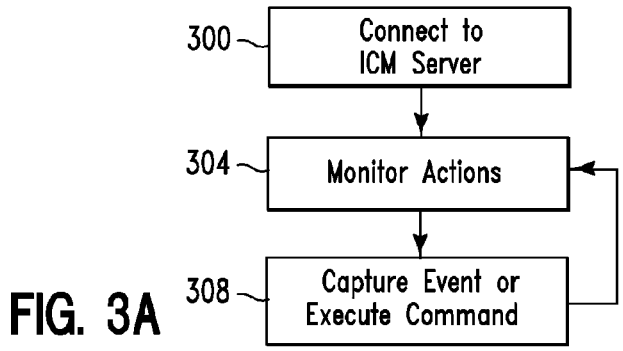
FIG. 3A illustrates an algorithm used by one of the ICM clients of FIG. 1, in accordance with embodiments of the present invention.

FIG. 3A illustrates an algorithm used by one of ICM clients 24a of FIG. 1, in accordance with embodiments of the present invention. In step 300, an ICM client connects to an ICM server. In step 304, the ICM client monitors actions associated with URLs and Internet actions. Additionally, the ICM client receives commands from the ICM server. In step 308, the ICM client captures an event and notifies the ICM server (i.e., of the event) and step 304 is repeated. Alternatively, one of the commands from the ICM server is executed and step 304 is repeated.

Figure 3B:
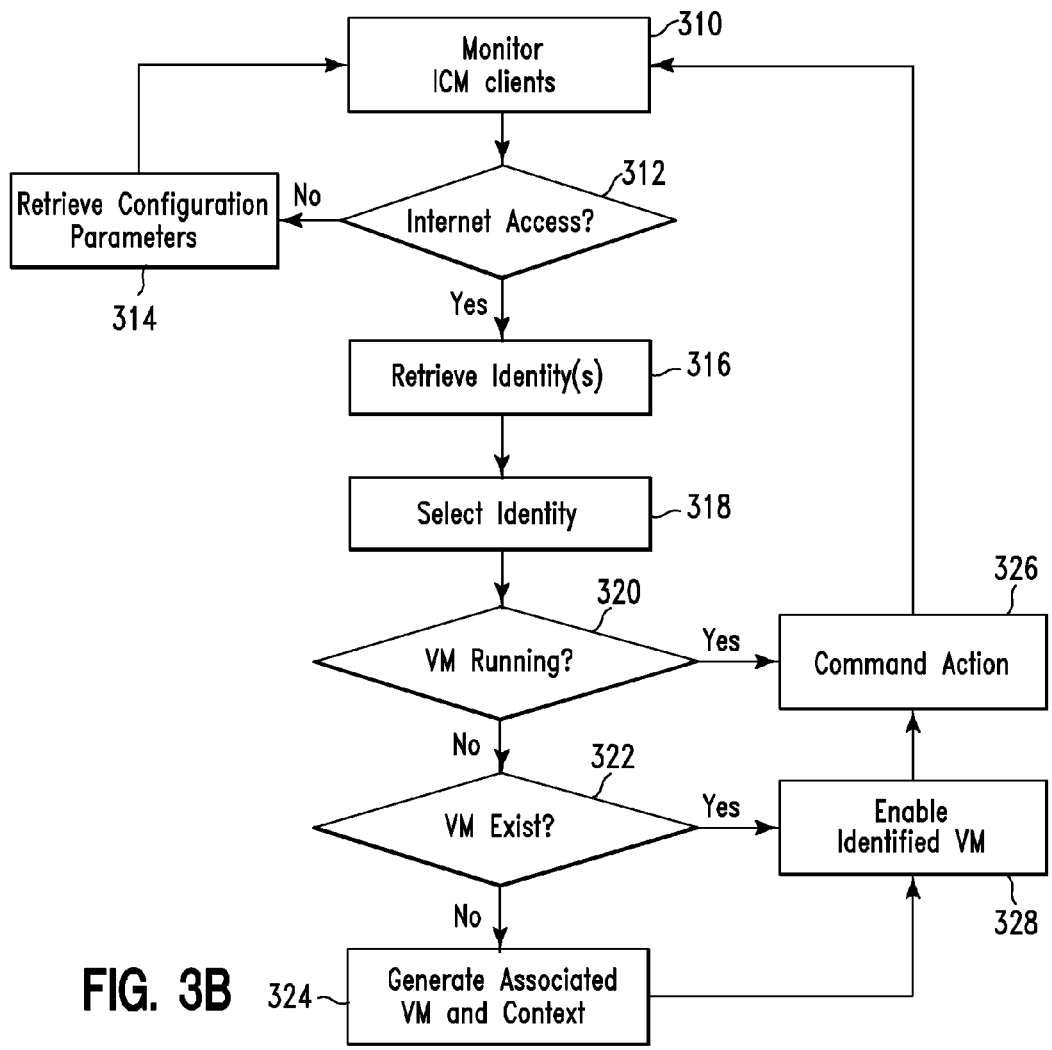
FIG. 3B illustrates an algorithm associated with a user action with respect to one of the ICM servers of FIG. 1, in accordance with embodiments of the present invention.

FIG. 3B illustrates an algorithm associated with a user action with respect to one of ICM servers 24b of FIG. 1, in accordance with embodiments of the present invention. In step 310, an ICM server monitors ICM clients. In step 312, it is determined if any of the ICM clients is accessing the Internet.

If in step 312, it is determined that none of the ICM clients is accessing the Internet then in step 314, the ICM server retrieves a configuration parameter (i.e., if a last state for an associated VM will be saved or reset (with an associated identity) to a previous state). If the associated identity comprises a hierarchal relationship then the associated VM is saved within the hierarchal relationship and step 310 is repeated.

If in step 312, it is determined that an ICM client of the ICM clients is accessing the Internet then in step 316, the ICM server retrieves an identity associated with a description for an Internet resource associated with the Internet access. In step 318, the ICM server provides a list of identities for user selection, receives a user selected identity (from the list), and retrieves associated Internet content. Alternatively, the ICM server may create a new identity and retrieve associated Internet content. In step 320, it is determined if an associated VM (i.e., associated with the identity from step 318) is enabled and running. If in step 320, it is determined that the associated VM is enabled and running then in step 326, a command within an ICM client (associated with the VM) executes an associated action and step 310 is repeated. If in step 320, it is determined that the associated VM is not enabled and running then in step 322, it is determined if the associated VM exists. If in step 322, it is determined that the associated VM exists then in step 328, the associated VM is enabled and step 326 is repeated. If in step 322, it is determined that the associated VM does not exist then in step 324, the associated VM is generated (e.g., as a delta) and step 328 is repeated.

Figure 3C:
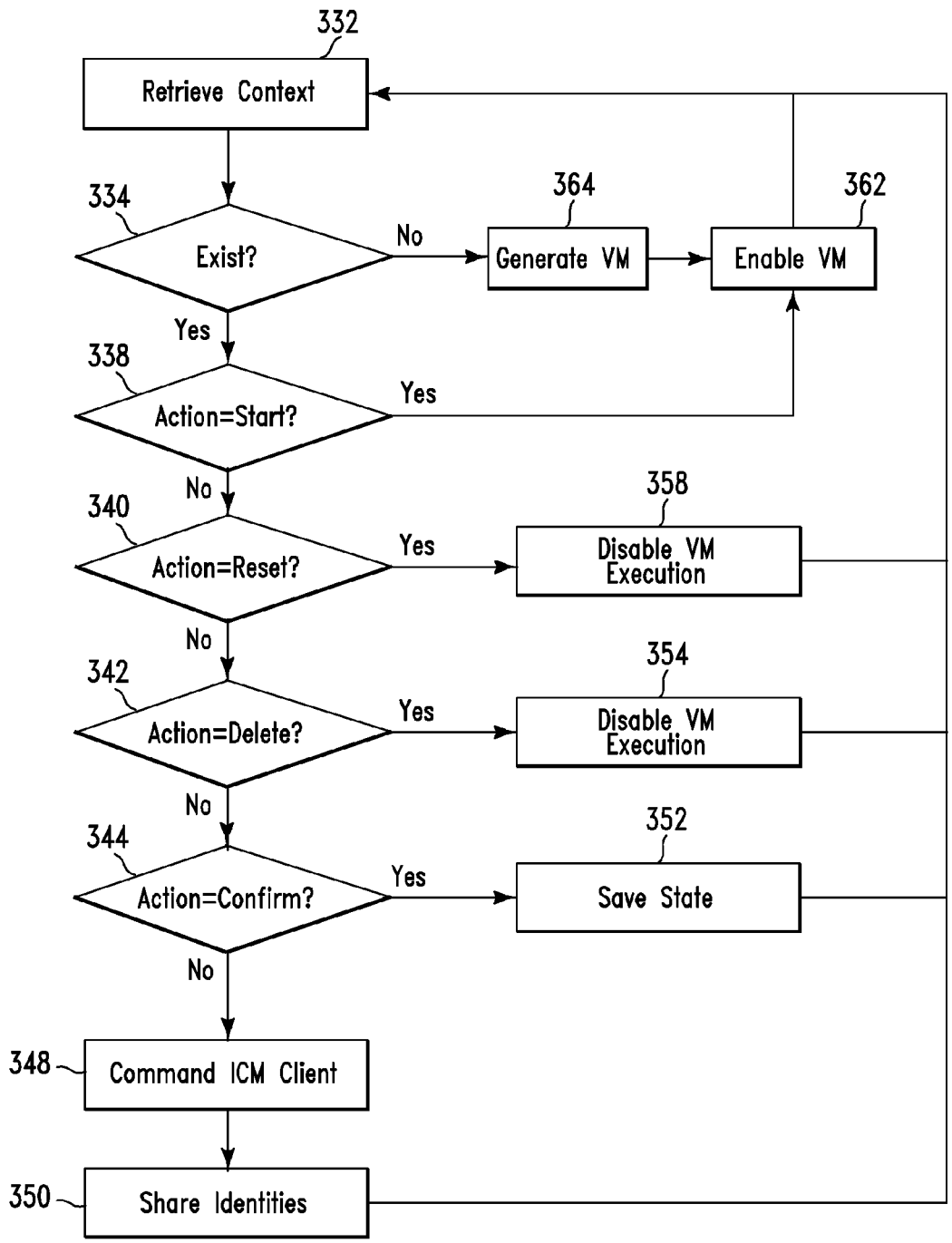
FIG. 3C illustrates an algorithm used by an administration enabled ICM server of FIG. 1, in accordance with embodiments of the present invention.

FIG. 3C illustrates an algorithm used by an administration enabled ICM server of FIG. 1, in accordance with embodiments of the present invention. In step 332, an ICM server attempt to retrieve context from a database. In step 334, it is determined if the associated context exists. If in step 334, it is determined that the associated context does not exist then in step 364, the associated context and associated VM are created (e.g., the VM may be created by a delta (differential feature) from a parent VM) and in step 362 the associated VM is enabled and step 332 is repeated. If in step 334, it is determined that the associated context does exist then in steps 338, 340, 342, and 344 associated actions are determined. If in step 338, the action comprises a start action then step 362 is repeated. If in step 338, the action does not comprise a start action then step 340 is executed. If in step 340, the action comprises a reset action then in step 358 the VM is deactivated and step 332 is repeated. If in step 340, the action does not comprise a reset action then step 342 is executed. If in step 342, the action comprises a delete action then in step 354 the VM is deactivated (and lower ordered VM states are merged with differential states) and step 332 is repeated. If in step 342, the action does not comprise a delete action then step 344 is executed. If in step 344, the action comprises a confirm action then in step 352 a current executing state is saved as a reference point and step 332 is repeated. If in step 342, the action does not comprise a confirm action then in step 348 an ICM client is commanded to save in a shared location and in step 350 identities are shared in the shared location and step 332 is repeated.

FIGS. 4A-4E illustrate implementation example sequence charts implemented by system 5 (of FIG. 1) for managing multiple identities, in accordance with embodiments of the present invention.

Figure 4A:
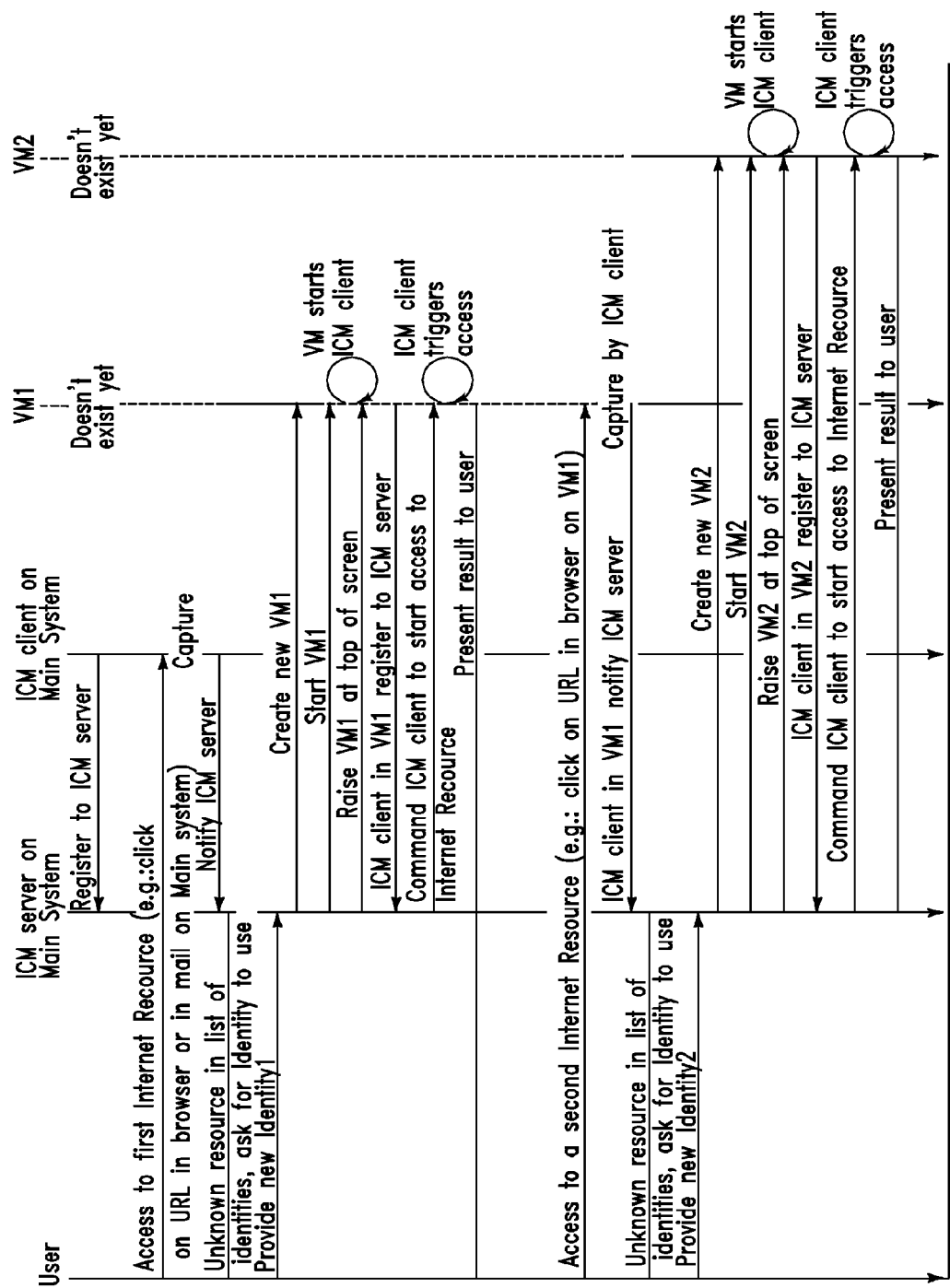
FIGS. 4A-4E illustrate implementation example sequence charts implemented by the system of FIG. 1, in accordance with embodiments of the present invention.

FIG. 4A illustrates the following sequence:

1. Identity context management (ICM) clients of a computing system (e.g., computing system 20 of FIG. 1) are registered with an ICM server of the computing system.
2. An ICM client monitors (for a user) access to a first Internet resource.
3. The ICM client transmits a notification (to the ICM server) indicating the access to the first Internet resource.
4. The ICM server transmits (to the user) a first request for an ID associated with the first Internet resource.
5. The ICM server receives (from the user in response to the first request) a first ID associated with the first Internet resource.
6. The ICM server records an association describing the first ID associated with the first Internet resource.
7. The ICM server generates (in response to receiving the first ID, a first virtual machine (VM) within said computing system.
8. The ICM server enables the first VM.
9. The first VM registers the ICM client with the ICM server.
10. The ICM client enables (in response to a command from the ICM server) access to the first Internet resource.
11. The first VM presents (to the user in response to enabling the first Internet resource) first Webpages and first Internet contents associated with the first Internet resource.
12. Any ICM client of the ICM clients monitors access to a second Internet resource associated with the first VM. The second Internet resource differs from the first Internet resource.
13. Any ICM client of the ICM clients transmits (to the ICM server) a notification indicating the access to the second Internet resource.
14. The ICM server transmits (to the user) a second request for an ID associated with the second Internet resource.
15. The ICM server receives (from the user in response to the second request) a second ID associated with the second Internet resource.
16. The ICM server records an association describing the second ID associated with the second Internet resource.
17. The ICM server generates (in response to receiving the second ID) a second VM within the computing system.
18. The ICM server enables the second VM.
19. The second VM registers an ICM client with the ICM server.
20. The ICM client enables (in response to a command from the ICM server) access to the second Internet resource.
21. The second VM presents (to the user in response to enabling the second Internet resource) second Webpages and second Internet contents associated with the second Internet resource.

Figure 4B:
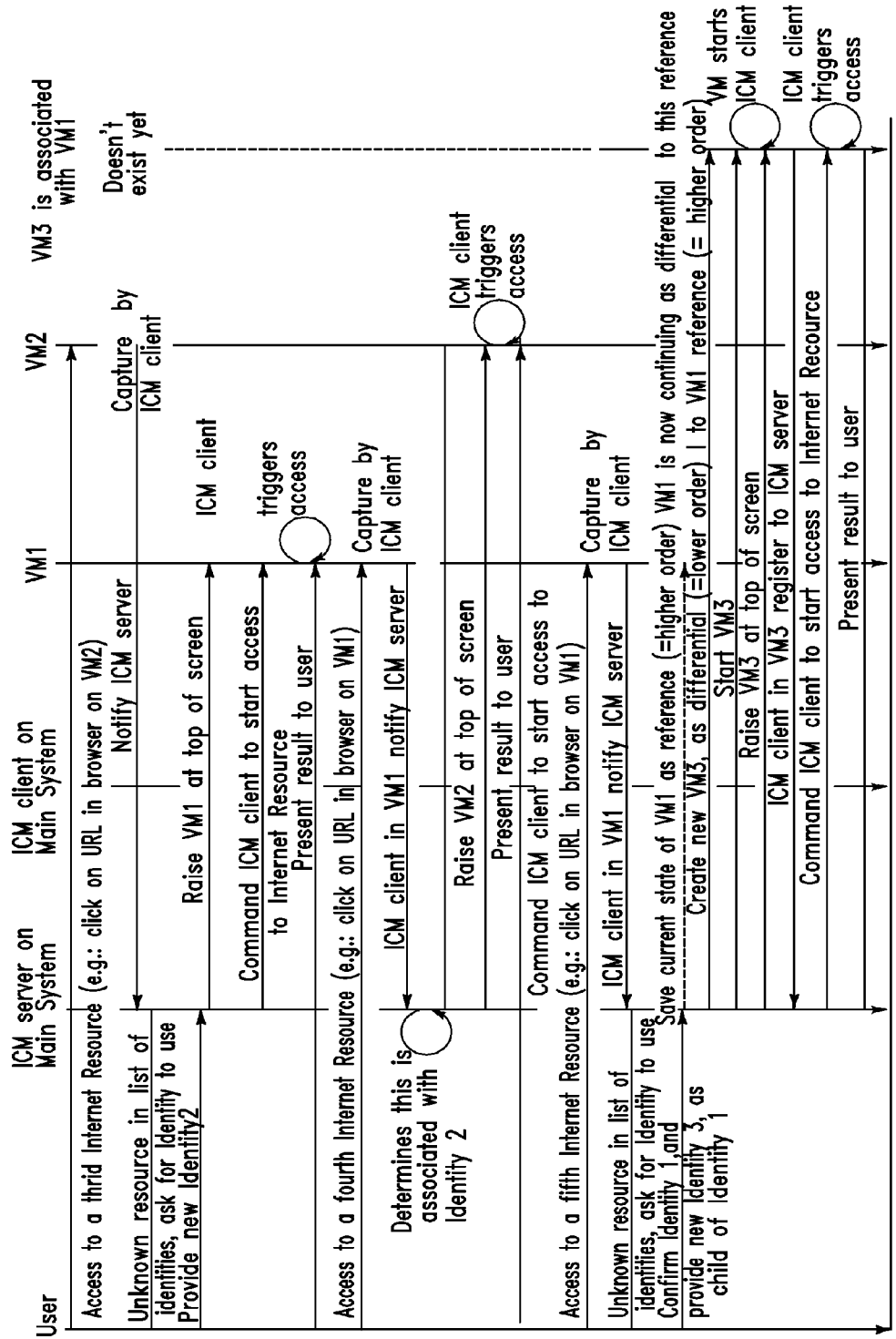

FIG. 4B illustrates the following sequence continued from the sequence of FIG. 4A:

1. Any ICM client monitors access to a third Internet resource. The third Internet resource is associated with the first ID and the second ID or is not associated with any IDs. The third Internet resource differs from the first Internet resource and the second Internet resource.
2. The ICM client transmits (to the ICM server) a notification indicating access to the third Internet resource.
3. The ICM server transmits (to the user) a third request for an ID associated with the third Internet resource.
4. The ICM server receives (from the user in response to the third request) the first ID or the second ID.
5. The ICM server records an association describing the existing ID associated with the third Internet resource.

6. The ICM client enables (within the first VM or the second VM in response to a command from the ICM server) access to the third Internet resource.
7. The first VM or the second VM presents (to the user in response to the enabling of step 6) the third Internet resource, the third Webpages, and the third Internet contents associated with the third Internet resource.
8. The ICM client monitors (for the user) access to a fourth Internet resource associated with the first VM or the second VM. The fourth Internet resource differs from the first Internet resource, the second Internet resource, and the third Internet resource.
9. The ICM client transmits (to the ICM server) a notification indicating access to the fourth Internet resource.
10. The ICM server determines that the first ID or the second ID is associated with the fourth Internet resource.
11. The ICM client (within the first VM or the second VM) enables (in response to a command from the ICM server) access to the fourth Internet resource.
12. The first VM or the second VM presents (to the user in response to enabling the fourth Internet resource) fourth Webpages and fourth Internet contents associated with the fourth Internet resource.
13. The ICM client monitors (for the user) access to a fifth Internet resource associated with the first VM. The fifth Internet resource is associated with the first ID and the second ID or is not associated with any IDs. The fifth Internet resource differs from the first Internet resource, the second Internet resource, the third Internet resource, and the fourth Internet resource.
14. The ICM client transmits (to the ICM server) a notification indicating access to the fifth Internet resource.
15. The ICM server transmits (to the user) a fourth request for an ID associated with the fifth Internet resource.
16. The ICM server receives (from the user in response to the fourth request) a third ID associated with the fifth Internet resource. The third ID is a lower ordered ID of the first ID.
17. The ICM server records an association describing the third ID associated with the fifth Internet resource.
18. The ICM server saves a first state of the first VM as a first reference thereby confirming the first ID.
19. The ICM server generates (in response to receiving the third ID and the saving the first state of the first VM) a third VM within the computing system. The third VM comprises a first differential with respect to the first state of the first VM as the first reference.
20. The ICM server enables the third VM.
21. The second VM registers a third copy of the ICM client within the third VM with the ICM server.
22. The third copy of the ICM client within the third VM enables (in response to a command from the ICM server) access to the fifth Internet resource.
23. The third VM presents (to the user in response to enabling the fifth Internet resource) fifth Webpages and fifth Internet contents associated with the fifth Internet resource.

Figure 4C:
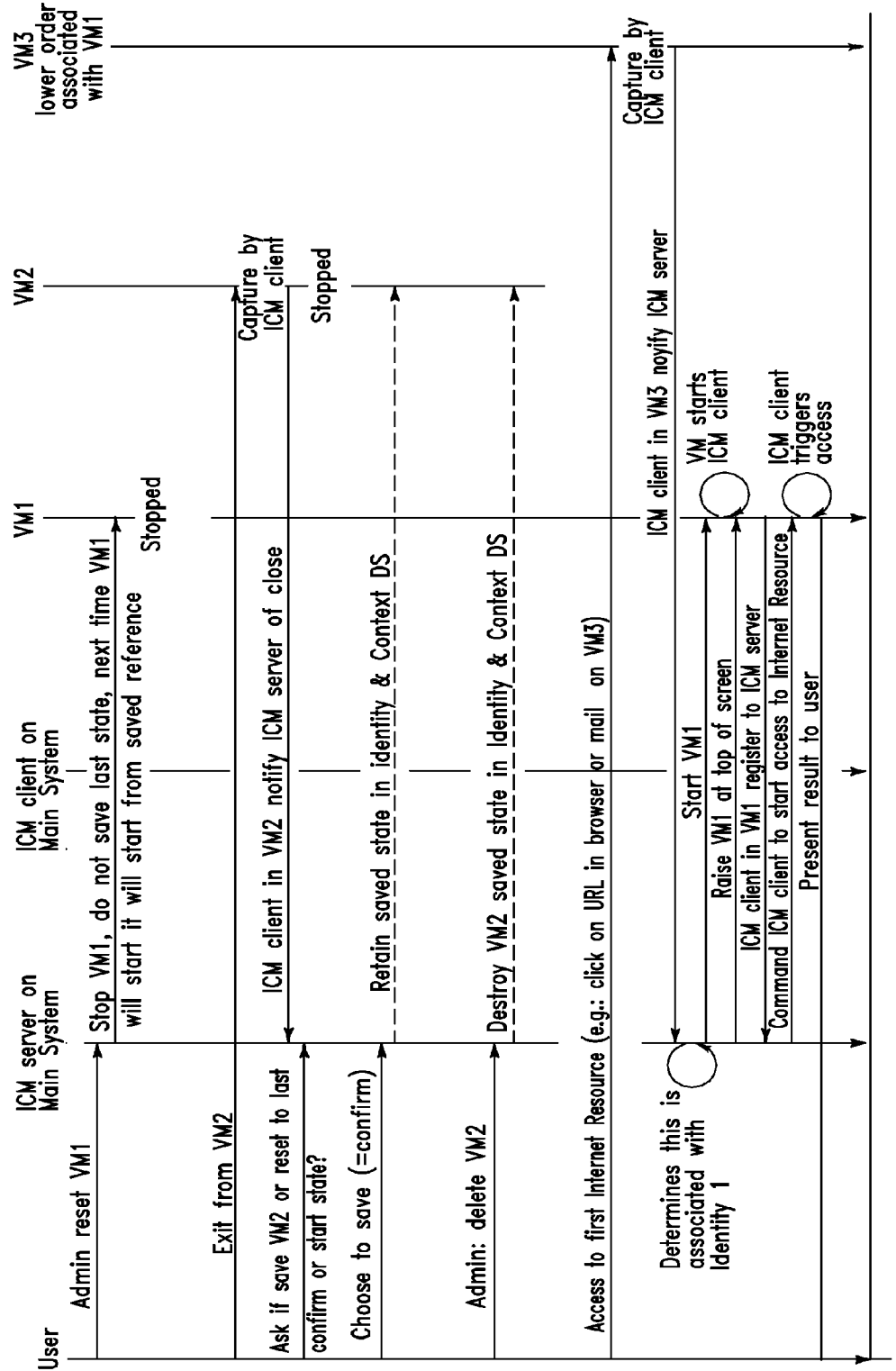

FIG. 4C illustrates the following sequence continued from the sequence of FIG. 4B:
1. The ICM server receives (from the user) a command for resetting the first VM, the second VM, or the third VM to a last stored state or a start state. The user operates as an administrator.
2. The ICM server disables (in response to the command for resetting the first VM, the second VM, or the third VM) the first VM, the second VM, or the third VM.
3. The first VM, the second VM, or the third VM receives (from the user) a command for exiting the first VM, the second VM, or the third VM.
4. The ICM server receives (from any the ICM client in response to the command for exiting the first VM, the second VM, or the third VM) a notification indicating that the first VM, the second VM, or the third VM will be closed.
5. The ICM server transmits (to the user) a request for saving or resetting a state (i.e., to a last starting point) of the first VM, the second VM, or the third VM that has been closed.
6. The ICM server receives (from the user in response to the request for saving or resetting the state) a decision for saving.
7. The ICM server saves a state of the first VM, the second VM, or the third VM upon being exited.
8. The ICM server receives a delete command.
9. The ICM server deletes the first VM, the second VM, the third VM, or the saved state.
10. The ICM client monitors (for the user) any additional access to an Internet resource associated with an existing deactivated VM.
11. The ICM client transmits (to the ICM server) a notification indicating the additional access to the Internet resource.
12. The ICM server determines that the Internet resource is associated with the first ID, the second ID, or the third ID associated with the first VM, the second VM, or the third VM currently in a deactivated state.
13. The ICM server enables the first VM, the second VM, or the third VM from a reference state.
14. An enabled VM (of the first VM, the second VM, or the third VM) registers a new ICM client within the enabled VM.
15. The new ICM client (within the enabled VM) enables (in response to a command from the ICM server) access to the Internet resource.
16. The enabled VM presents (to the user in response to the enabling of step 15) the Internet resource, Webpages, and Internet contents associated with the Internet resource.

Figure 4D:
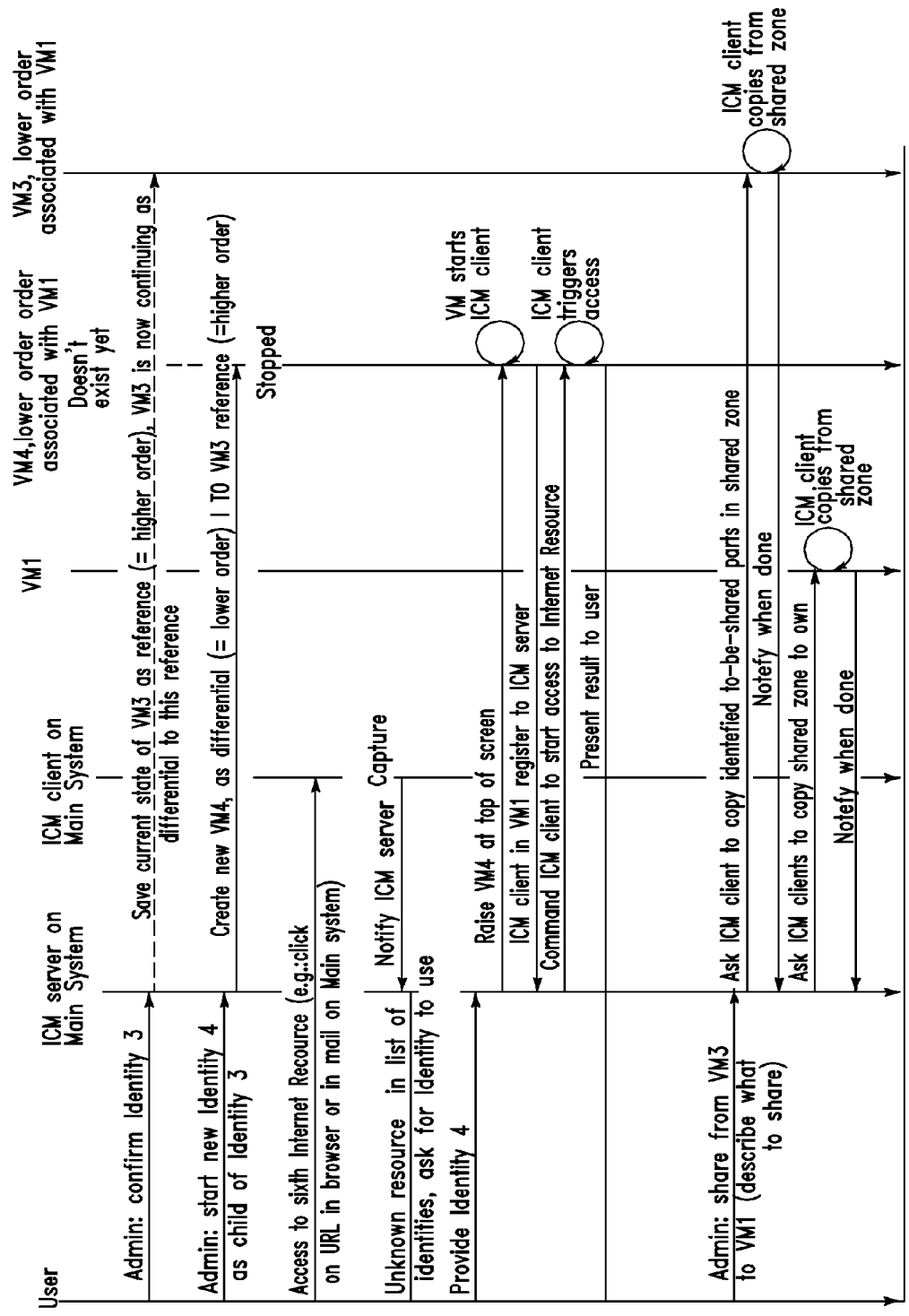

FIG. 4D illustrates the following sequence continued from the sequence of FIG. 4C:
1. The ICM server receives (from the user) a command for confirming the first ID, the second ID, or the third ID.
2. The ICM server saves a first state of a VM of the first ID, the second ID, or the third ID to confirm as a second reference.
3. The ICM server receives (from the user) a command for generating a fourth ID as a lower ordered entity and a differential with respect to an existing confirmed ID.
4. The ICM client monitors (for the user) access to a sixth Internet resource.
5. The ICM client transmits (to the ICM server) a notification indicating access to the sixth Internet resource.
6. The ICM client transmits (to the ICM server) a request for an ID.
7. The ICM server receives (from the user in response to the request for the ID) the fourth ID.
8. The ICM server records an association describing the fourth ID.
9. The fourth VM registers a fifth copy of the ICM client within the fourth VM.
10. The fourth VM enables (in response to a command from the ICM server) access to the sixth Internet resource.
11. The fourth VM presents (to the user in response to the enabling of step 10) the sixth Internet resource, sixth Webpages, and sixth Internet contents associated with the sixth Internet resource.
12. The ICM server receives (from the user) a command for sharing identified content from the first VM, the second VM, the third VM, or the fourth VM with the first VM, the second VM, the third VM, or the fourth VM.
13. The ICM client copies (in response to the command for sharing the identified content) the shared content to a shared zone.

14. The first VM, the second VM, the third VM, or the fourth VM copies the shared content from the shared zone to a protected zone.

Figure 4E:
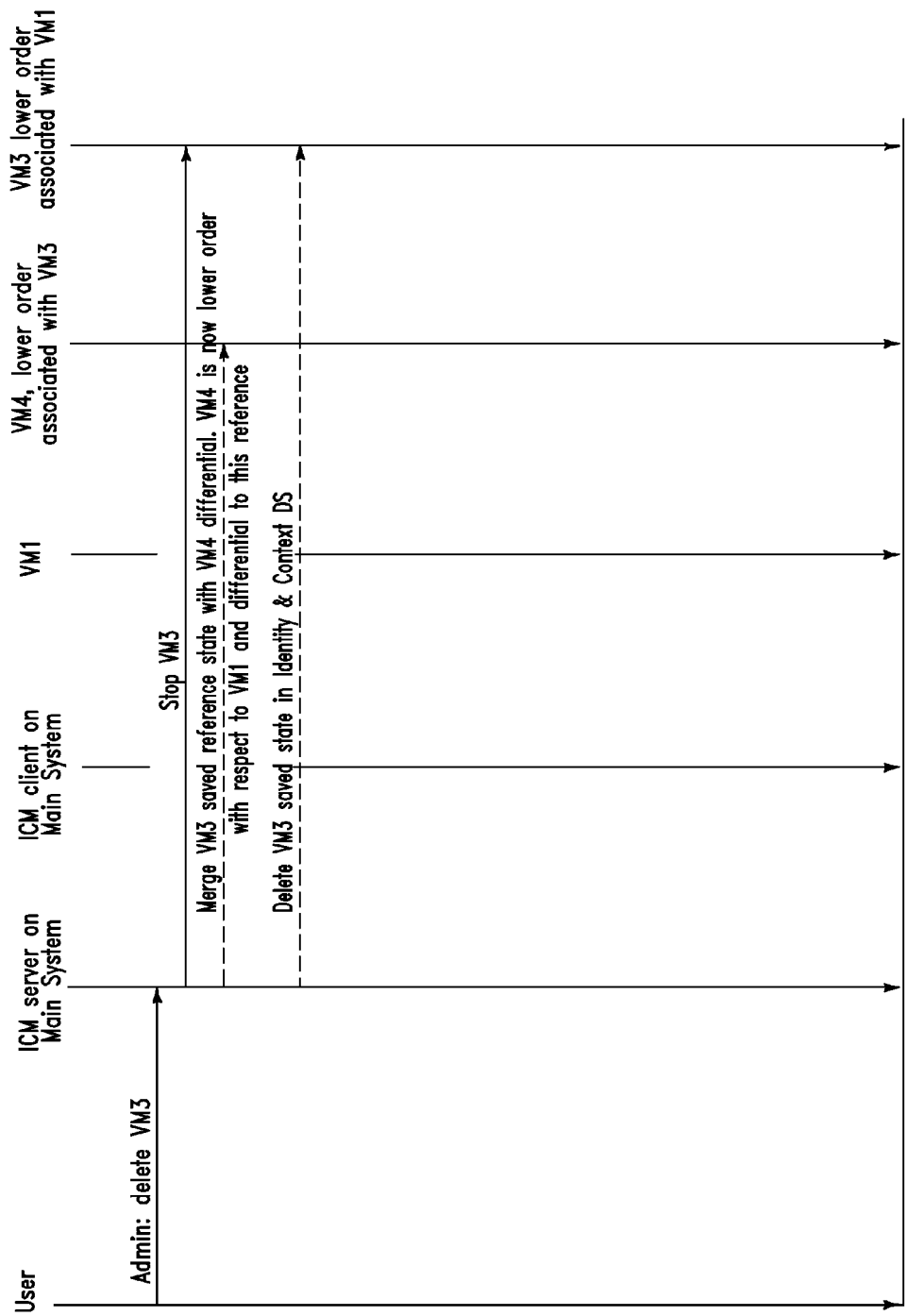

FIG. 4E illustrates the following sequence continued from the sequence of FIG. 4D:

1. The ICM server receives (from the user) a command for deleting a selected ID selected from the first ID, the second ID, the third ID, or the fourth ID. The selected ID is a lower ordered ID of another ID and comprises a lower ordered ID.
2. The ICM server disables the selected ID and associated VM.
3. The ICM server merges a differential with a reference state.
4. The ICM server deletes a selected ID and VM.

Figure 5:
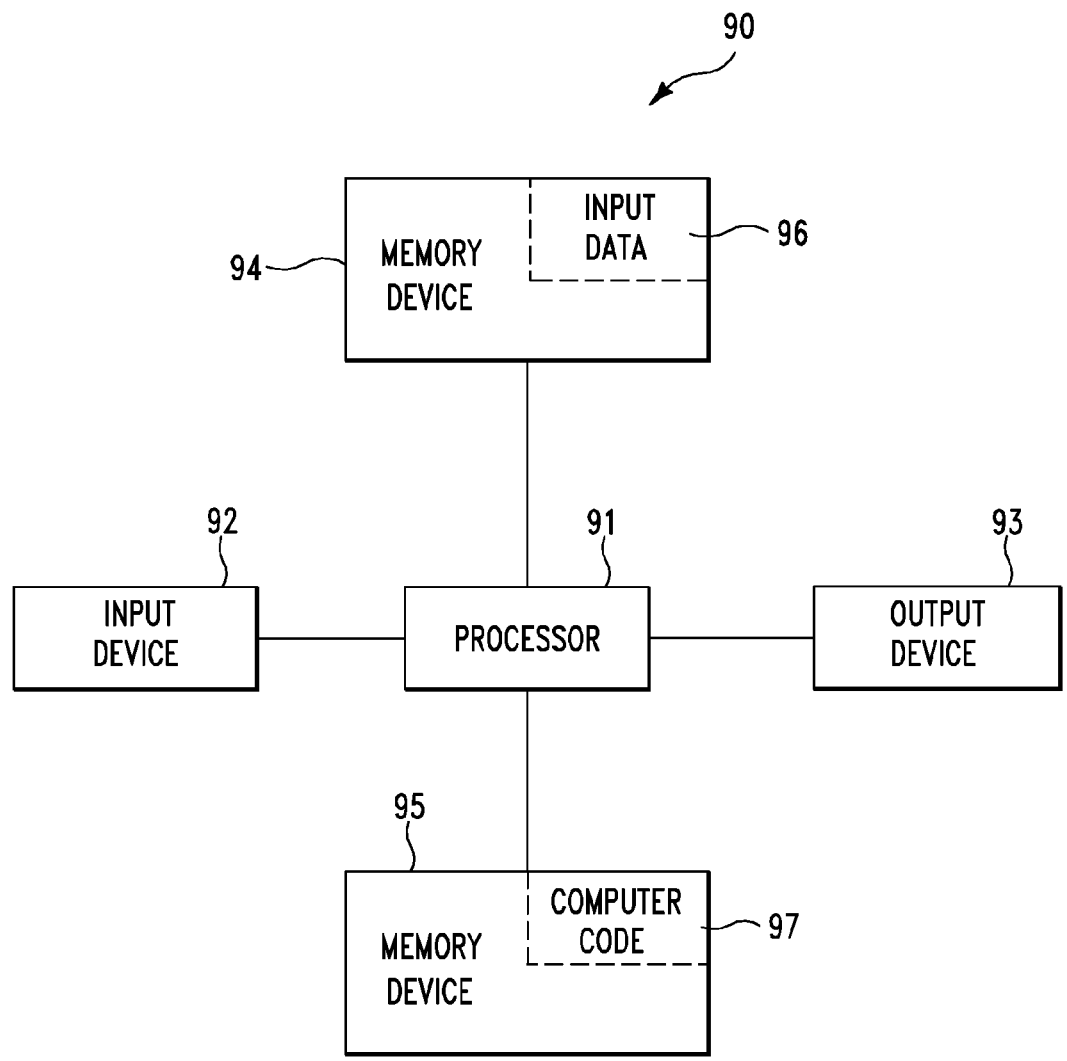
FIG. 5 illustrates a computer apparatus used for managing multiple identities, in accordance with embodiments of the present invention.

FIG. 5 illustrates a computer apparatus 90 (e.g., computing system 20 of FIG. 1) used for managing multiple identities, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-4E) for managing multiple identities. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may comprise the algorithms of FIGS. 2-4E and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service provider who offers to manage multiple identities. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for locating specified information associated with a Webpage(s). In another embodiment, the invention provides a method that performs the process steps of the invention on a subscription, advertising, and/or fee basis. That is, a service provider, such as a Solution Integrator, could offer to manage multiple identities. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. An identity management method comprising:
registering, by a computer processor of a computing system, identity context management (ICM) clients of said computing system with an ICM server of said computing system;
monitoring for a user, by an ICM client of said ICM clients, access to a first Internet resource;
transmitting, by said ICM client to said ICM server, a notification indicating said access to said first Internet resource;
transmitting, by said ICM server to said user, a first request for an ID associated with said first Internet resource;
receiving, by said ICM server from said user in response to said first request, a first ID associated with said first Internet resource;
recording, by said ICM server, an association describing said first ID associated with said first Internet resource;
generating, by said ICM server in response to said receiving said first ID, a first virtual machine (VM) within said computing system;
enabling, by said ICM client in response to a command from said ICM server, access to said first Internet resource;
presenting, by said first VM to said user in response to said enabling said first Internet resource, first Webpages, and first Internet contents associated with said first Internet resource;
transmitting, by said ICM server to said user, a fourth request for an ID associated with a fifth Internet resource associated with said first VM;
receiving, by said ICM server from said user in response to said fourth request, a third ID associated with said fifth Internet resource, wherein said third ID is a lower ordered ID of said first ID;
saving, by said ICM server, a first state of said first VM as a first reference thereby confirming said first ID; and
generating, by said ICM server in response to said receiving said third ID and said saving said first state of said first VM, a third VM within said computing system, wherein said third VM comprises a first differential with respect to said first state of said first VM as said first reference.

2. The method of claim 1, further comprising:
monitoring for said user, by any ICM client of said ICM clients, access to a second Internet resource associated with said first VM, wherein said second Internet resource differs from said first Internet resource;
transmitting, by any said ICM client to said ICM server, a notification indicating said access to said second Internet resource;

transmitting, by said ICM server to said user, a second request for an ID associated with said second Internet resource;
receiving, by said ICM server from said user in response to said second request, a second ID associated with said second Internet resource;
recording, by said ICM server, an association describing said second ID associated with said second Internet resource;
generating, by said ICM server in response to said receiving said second ID, a second VM within said computing system;
enabling, by said ICM server, said second VM;
registering, by said second VM, any said ICM client with said ICM server;
enabling, by any said ICM client in response to a command from said ICM server, access to said second Internet resource; and
presenting, by said second VM to said user in response to said enabling said second Internet resource, second Webpages, and second Internet contents associated with saidsecond Internet resource.

3. The method of claim 2, further comprising:
monitoring for said user, by any said ICM client, access to a third Internet resource, wherein said third Internet resource is associated with said first ID and said second ID or is not associated with any IDs, and wherein said third Internet resource differs from said firstInternet resource and said second Internet resource;
transmitting, by any said ICM client to said ICM server, a notification indicating said access to said third Internet resource;
transmitting, by said ICM server to said user, a third request for an ID associated with said third Internet resource;
receiving, by said ICM server from said user in response to said third request, said first ID or said second ID;
recording, by said ICM server, an association describing said existing ID associated with said third Internet resource;
second enabling, by any said ICM client within said first VM or said second VM in response to a command from said ICM server, access to said third Internet resource; and
presenting, by said first VM or said second VM to said user in response to said second enabling said third Internet resource, said third Webpages, and said third Internet contents associated with said third Internet resource.

4. The method of claim 3, further comprising:
monitoring for said user, by any said ICM client, access to a fourth Internet resource associated with said first VM or said second VM, wherein said fourth Internet resource differs from said first Internet resource, and said second Internet resource, and said third Internet resource;
transmitting, by any said ICM client to said ICM server, a notification indicating said access to said fourth Internet resource;
determining, by said ICM server, that said first ID or said second ID is associated with said fourth Internet resource;
enabling, by any said ICM client within said first VM or said second VM in response to a command from said ICM server, access to said fourth Internet resource; and
presenting, by said first VM or said second VM to said user in response to said enabling said fourth Internet resource, fourth Webpages, and fourth Internet contents associated with said fourth Internet resource.

5. The method of claim 4, further comprising:
monitoring for said user, by any said ICM client, access to said fifth Internet resource associated with said first VM, wherein said fifth Internet resource is associated with said first ID and said second ID or is not associated with any IDs, and wherein said fifth Internet resource differs from said first Internet resource, said second Internet resource, said third Internet resource, and said fourth Internet resource;
transmitting, by any said ICM client to said ICM server, a notification indicating said access to said fifth Internet resource;
recording, by said ICM server, an association describing said third ID associated with said fifth Internet resource;
enabling, by said ICM server, said third VM;
registering, by said second VM, a third copy of said ICM client within said third VM with said ICM server;
enabling, by said third copy of said ICM client within said third VM in response to a command from said ICM server, access to said fifth Internet resource; and
presenting, by said third VM to said user in response to said enabling said fifth Internet resource, fifth Webpages and fifth Internet contents associated with said fifth Internet resource.

6. The method of claim 5, further comprising:
receiving from said user, by said ICM server, a command for resetting said first VM, said second VM, or said third VM to a last stored state or a start state, wherein said user operates as an administrator;
disabling, by said ICM server in response to said command for resetting said first VM, said second VM, or said third VM, said first VM, said second VM, or said third VM;
receiving from said user, by said first VM, said second VM, or said third VM, a command for exiting said first VM, said second VM, or said third VM;
receiving by said ICM server from any said ICM client in response to said command for exiting said first VM, said second VM, or said third VM, a notification indicating that said first VM, said second VM, or said third VM will be closed;
transmitting, by said ICM server to said user, a request for saving or resetting a state, to a last starting point, of said first VM, said second VM, or said third VM that has been closed;
receiving, by said ICM server from said user in response to said request for saving or resetting said state, a decision for saving;
saving, by said ICM server, a state of said first VM, said second VM, or said third VM upon being exited;
receiving, by said ICM server, a delete command; and
deleting, by said ICM server, said first VM, said second VM, said third VM, or said saved state.

7. The method of claim 6, further comprising:
monitoring for said user, by any said ICM client, additional access to an Internet resource associated with an existing deactivated VM;
transmitting, by any said ICM client to said ICM server, a notification indicating said additional access to said Internet resource;
determining, by said ICM server, that said Internet resource is associated with said first ID, said second ID, or said third ID associated with said first VM, said second VM, or said third VM currently in a deactivated state;
enabling, by said ICM server, said first VM, said second VM, or said third VM from a reference state;

registering, by an enabled VM of said first VM, said second VM, or said third VM, a new ICM client within said enabled VM;

second enabling, by said new ICM client within said enabled VM in response to a command from said ICM server, access to said Internet resource; and presenting, by said enabled VM to said user in response to said second enabling said Internet resource, Webpages and Internet contents associated with said Internet resource.

8. The method of claim 7, further comprising:

receiving from said user, by said ICM server, a command for confirming said first ID, said second ID, or said third ID;

saving, by said ICM server, a first state of a VM of said first ID, said second ID, or said third ID to confirm as a second reference; and receiving from said user, by said ICM server, a command for generating a fourth ID as a lower ordered ID and a differential with respect to an existing confirmed ID.

9. The method of claim 8, further comprising:

monitoring for said user, by any said ICM client, access to a sixth Internet resource;

transmitting, by any said ICM client to said ICM server, a notification indicating said access to said sixth Internet resource;

transmitting, by said ICM client to said ICM server, a request for an ID;

receiving, by said ICM server from said user in response to said request for said ID, said fourth ID;

recording, by said ICM server, an association describing said fourth ID;

registering, by said fourth VM, a fifth copy of said ICM client within said fourth VM;

enabling, by said fourth VM in response to a command from said ICM server, access to said sixth Internet resource; and presenting, by said fourth VM to said user in response to said enabling said sixth Internet resource, sixth Webpages and sixth Internet contents associated with saidsixth Internet resource.

10. The method of claim 9, further comprising:

receiving from said user, by said ICM server, a command for sharing identified content from said first VM, said second VM, said third VM, or said fourth VM with said first VM, said second VM, said third VM, or said fourth VM;

copying, by any said ICM client in response to said command for sharing said identified content, said shared content to a shared zone; and copying, by said first VM, said second VM, said third VM, or said fourth VM, said shared content from said shared zone to a protected zone.

11. The method of claim 10, further comprising:

receiving from said user, by said ICM server, a command for deleting a selected ID selected from said first ID, said second ID, said third ID, or said fourth ID, wherein said selected ID is a lower ordered ID of another ID and comprises a lower ordered ID;

disabling, by said ICM server, said selected ID and associated VM;

merging, by said ICM server, a differential with a reference state; and deleting, by said ICM server, a selected ID and VM.

12. The method of claim 1, further comprising:

providing at least one support service for at least one of creating, integrating, hosting, maintaining, and deploying computer-readable code in said computing system, wherein the code in combination with the computing system is capable of performing: said registering said ICM clients, said monitoring, said transmitting said notification, said transmitting said first request, said receiving, said recording, said generating, said enabling said first VM, said registering said ICM client, said enabling said access, and said presenting.

13. A computer program product, comprising a computer readable hardware storage device storing a computer readable program code, said computer readable program code comprising an algorithm that when executed by a computer processor of a computing system implements a method comprising:

registering, by said computer processor, identity context management (ICM) clients of said computing system with an ICM server of said computing system;

monitoring for a user, by an ICM client of said ICM clients, access to a first Internet resource;

transmitting, by said ICM client to said ICM server, a notification indicating said access to said first Internet resource;

transmitting, by said ICM server to said user, a first request for an ID associated with said first Internet resource;

receiving, by said ICM server from said user in response to said first request, a first ID associated with said first Internet resource;

recording, by said ICM server, an association describing said first ID associated with said first Internet resource;

generating, by said ICM server in response to said receiving said first ID, a first virtual machine (VM) within said computing system;

enabling, by said ICM client in response to a command from said ICM server, access to said first Internet resource;

presenting, by said first VM to said user in response to said enabling said first Internet resource, first Webpages, and first Internet contents associated with said first Internet resource;

transmitting, by said ICM server to said user, a fourth request for an ID associated with a fifth Internet resource associated with said first VM;

receiving, by said ICM server from said user in response to said fourth request, a third ID associated with said fifth Internet resource, wherein said third ID is a lower ordered ID of said first ID;

saving, by said ICM server, a first state of said first VM as a first reference thereby confirming said first ID; and generating, by said ICM server in response to said receiving said third ID and said saving said first state of said first VM, a third VM within said computing system, wherein said third VM comprises a first differential with respect to said first state of said first VM as said first reference.

14. The computer program product of claim 13, further comprising:

monitoring for said user, by any ICM client of said ICM clients, access to a second Internet resource associated with said first VM, wherein said second Internet resource differs from said first Internet resource;

transmitting, by any said ICM client to said ICM server, a notification indicating said access to said second Internet resource;

transmitting, by said ICM server to said user, a second request for an ID associated with said second Internet resource;

receiving, by said ICM server from said user in response to said second request, a second ID associated with said second Internet resource;

recording, by said ICM server, an association describing said second ID associated with said second Internet resource;

generating, by said ICM server in response to said receiving said second ID, a second VM within said computing system;

enabling, by said ICM server, said second VM;

registering, by said second VM any said ICM client with said ICM server;

enabling, by any said ICM client in response to a command from said ICM server, access to said second Internet resource; and presenting, by said second VM to said user in response to said enabling said second Internet resource, second Webpages and second Internet contents associated with said second Internet resource.

15. The computer program product of claim 14, further comprising:

monitoring for said user, by any said ICM client, access to a third Internet resource, wherein said third Internet resource is associated with said first ID and said second ID or is not associated with any IDs, and wherein said third Internet resource differs from said first Internet resource and said second Internet resource;

transmitting, by any said ICM client to said ICM server, a notification indicating said access to said third Internet resource;

transmitting, by said ICM server to said user, a third request for an ID associated with said third Internet resource;

receiving, by said ICM server from said user in response to said third request, said first ID or said second ID;

recording, by said ICM server, an association describing said existing ID associated with said third Internet resource;

second enabling, by any said ICM client within said first VM or said second VM in response to a command from said ICM server, access to said third Internet resource; and presenting, by said first VM or said second VM to said user in response to said second enabling said third Internet resource, said third Webpages and said third Internet contents associated with said third Internet resource.

16. The computer program product of claim 15, further comprising:

monitoring for said user, by any said ICM client, access to a fourth Internet resource associated with said first VM or said second VM, wherein said fourth Internet resource differs from differs from said first Internet resource, and said second Internet resource, and said third Internet resource;

transmitting, by any said ICM client to said ICM server, a notification indicating said access to said fourth Internet resource;

determining, by said ICM server, that said first ID or said second ID is associated with said fourth Internet resource;

enabling, by any said ICM client within said first VM or said second VM in response to a command from said ICM server, access to said fourth Internet resource; and presenting, by said first VM or said second VM to said user in response to said enabling said fourth Internet resource, fourth Webpages and fourth Internet contents associated with said fourth Internet resource.

17. The computer program product of claim 16, further comprising:

monitoring for said user, by any said ICM client, access to a fifth Internet resource associated with said first VM, wherein said fifth Internet resource is associated with said first ID and said second ID or is not associated with any IDs, and wherein said fifth Internet resource differs from said first Internet resource, said second Internet resource, said third Internet resource, and said fourth Internet resource;

transmitting, by any said ICM client to said ICM server, a notification indicating said access to said fifth Internet resource;

recording, by said ICM server, an association describing said third ID associated with said fifth Internet resource;

enabling, by said ICM server, said third VM;

registering, by said second VM, a third copy of said ICM client within said third VM with said ICM server;

enabling, by said third copy of said ICM client within said third VM in response to a command from said ICM server, access to said fifth Internet resource; and presenting, by said third VM to said user in response to said enabling said fifth Internet resource, fifth Webpages and fifth Internet contents associated with said fifth Internet resource.

18. The computer program product of claim 17, further comprising:

receiving from said user, by said ICM server, a command for resetting said first VM, said second VM, or said third VM to a last stored state or a start state, wherein said user operates as an administrator;

disabling, by said ICM server in response to said command for resetting said first VM, said second VM, or said third VM, said first VM, said second VM, or said third VM;

receiving from said user, by said first VM, said second VM, or said third VM, a command for exiting said first VM, said second VM, or said third VM;

receiving by said ICM server from any said ICM client in response to said command for exiting said first VM, said second VM, or said third VM, a notification indicating that said for said first VM, said second VM, or said third VM will be closed;

transmitting, by said ICM server to said user, a request for saving or resetting a state, to a last starting point, of said first VM, said second VM, or said third VM that has been closed;

receiving, by said ICM server from said user in response to said request for saving or resetting said state, a decision for saving;

saving, by said ICM server, a state of said first VM, said second VM, or said third VM upon being exited;

receiving, by said ICM server, a delete command; and deleting, by said ICM server, said first VM, said second VM, said third VM, or said saved state.

19. The computer program product of claim 18, further comprising:

monitoring for said user, by any said ICM client, additional access to an Internet resource associated with an existing deactivated VM;

transmitting, by any said ICM client to said ICM server, a notification indicating said additional access to said Internet resource;

determining, by said ICM server, that said Internet resource is associated with said first ID, said second ID, or said third ID associated with said first VM, said second VM, or said third VM currently in a deactivated state;

enabling, by said ICM server, said first VM, said second VM, or said third VM from a reference state;

registering, by an enabled VM of said first VM, said second VM, or said third VM, a new ICM client within said enabled VM;

second enabling, by said new ICM client within said enabled VM in response to a command from said ICM server, access to said Internet resource; and presenting, by said enabled VM to said user in response to said second enabling said Internet resource, Webpages and Internet contents associated with said Internet resource.

20. A computing system comprising a computer processor coupled to a computer-readable memory unit, said memory unit comprising instructions that when executed by the computer processor implements a method comprising:

registering, by said computer processor, identity context management (ICM) clients of said computing system with an ICM server of said computing system;

monitoring for a user, by an ICM client of said ICM clients, access to a first Internet resource;

transmitting, by said ICM client to said ICM server, a notification indicating said access to said first Internet resource;

transmitting, by said ICM server to said user, a first request for an ID associated with said first Internet resource;

receiving, by said ICM server from said user in response to said first request, a first ID associated with said first Internet resource;

recording, by said ICM server, an association describing said first ID associated with said first Internet resource;

generating, by said ICM server in response to said receiving said first ID, a first virtual machine (VM) within said computing system;

enabling, by said ICM client in response to a command from said ICM server, access to said first Internet resource;

presenting, by said first VM to said user in response to said enabling said first Internet resource, first Webpages, and first Internet contents associated with said first Internet resource;

transmitting, by said ICM server to said user, a fourth request for an ID associated with a fifth Internet resource associated with said first VM;

receiving, by said ICM server from said user in response to said fourth request, a third ID associated with said fifth Internet resource, wherein said third ID is a lower ordered ID of said first ID;

saving, by said ICM server, a first state of said first VM as a first reference thereby confirming said first ID; and generating, by said ICM server in response to said receiving said third ID and said saving said first state of said first VM, a third VM within said computing system, wherein said third VM comprises a first differential with respect to said first state of said first VM as said first reference.

* * * * *